United States Patent [19]

Cole

[11] 4,361,832

[45] Nov. 30, 1982

[54] AUTOMATIC CENTRALIZED MONITORING SYSTEM

[76] Inventor: Martin T. Cole, 3 David St., East Bentleigh, Victoria, Australia

[21] Appl. No.: 869,009

[22] Filed: Jan. 12, 1978

[30] Foreign Application Priority Data

Jan. 28, 1977 [AU] Australia .............................. PC8888

[51] Int. Cl.[3] ....................... G08B 29/00; H04M 11/04

[52] U.S. Cl. .................................... 340/505; 340/506; 340/518; 340/531; 340/825.06; 340/825.54; 340/825.55; 179/5 R

[58] Field of Search ............... 340/505, 500, 506, 517, 340/518, 151, 152 R, 531, 152 T, 525, 825.06, 825.07, 825.09, 825.10–825.13, 825.54, 825.55, 870.09, 870.12, 870.13; 179/5 R, 2 R, 20 P, 2 A, 24 M

[56] References Cited

U.S. PATENT DOCUMENTS

| | | | |
|---|---|---|---|
| 3,523,281 | 8/1970 | Willcox et al. | 340/151 |
| 3,575,035 | 9/1973 | Sullivan | 340/152 T |
| 3,754,215 | 8/1973 | Blomenkamp | 340/151 |
| 3,868,640 | 2/1975 | Binnie et al. | 340/151 |
| 3,903,507 | 9/1975 | Dillingham | 340/151 |
| 4,017,683 | 4/1977 | Pederson et al. | 340/518 |
| 4,056,684 | 11/1977 | Lindstrom | 340/518 |
| 4,067,008 | 1/1978 | Sprowls | 340/505 |
| 4,101,872 | 7/1978 | Pappas | 340/164 R |

*Primary Examiner*—Caldwell, Sr. John W.
*Assistant Examiner*—Donnie L. Crosland
*Attorney, Agent, or Firm*—Learman & McCulloch

[57] ABSTRACT

An automatic centralized monitoring system capable of monitoring various sensors in a plurality of premises with rapidity; this is accomplished by combining the premises into a plurality of groups; the central station is provided with as many computer-controlled line drivers as there are groups; all of the line drivers are able to simultaneously read the sensors in one premise of each group. The sensor readings are multiplexed and returned to the computer which interprets the readings.

11 Claims, 9 Drawing Figures

FIG. 1. E6000 SYSTEM DIAGRAM.
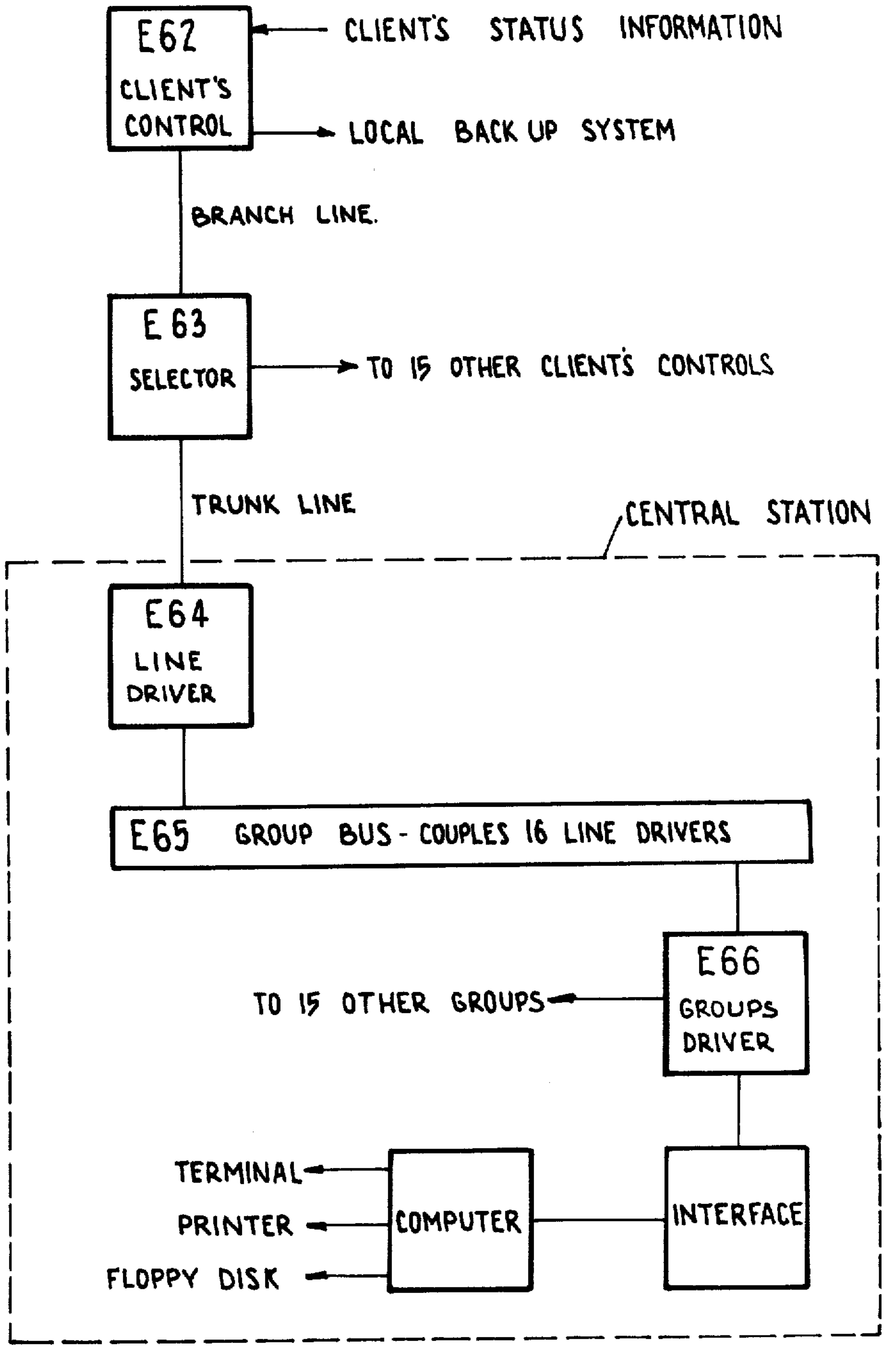

FIG. 2 E 6800 SYSTEM
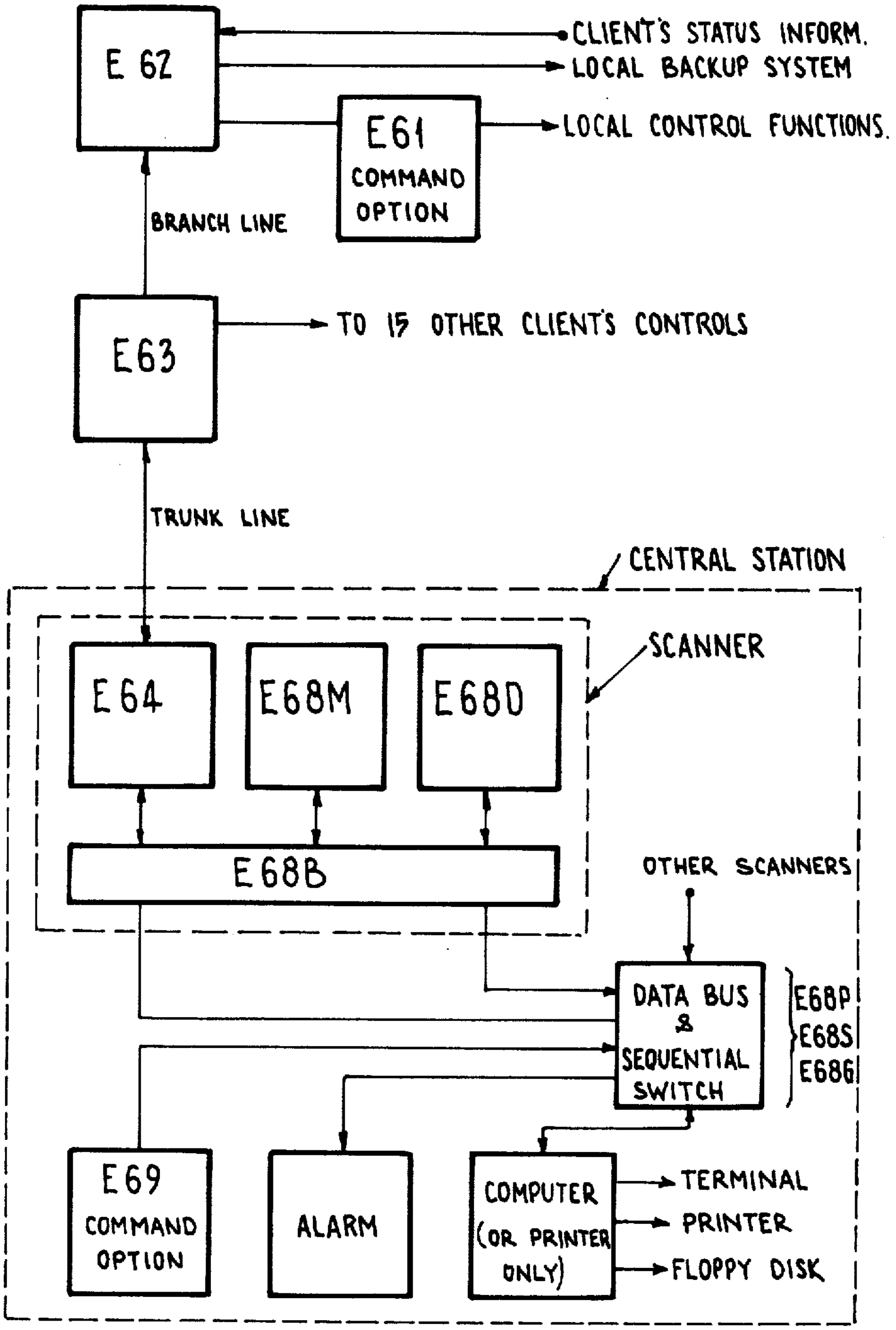

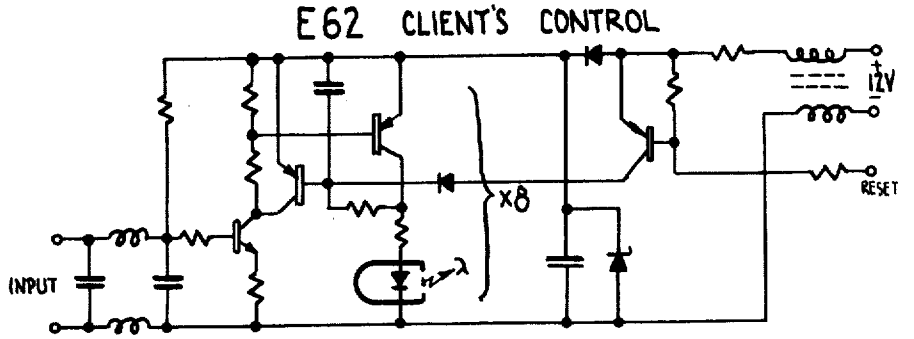
FIG. 3(a) ALARM SYSTEM SECTION
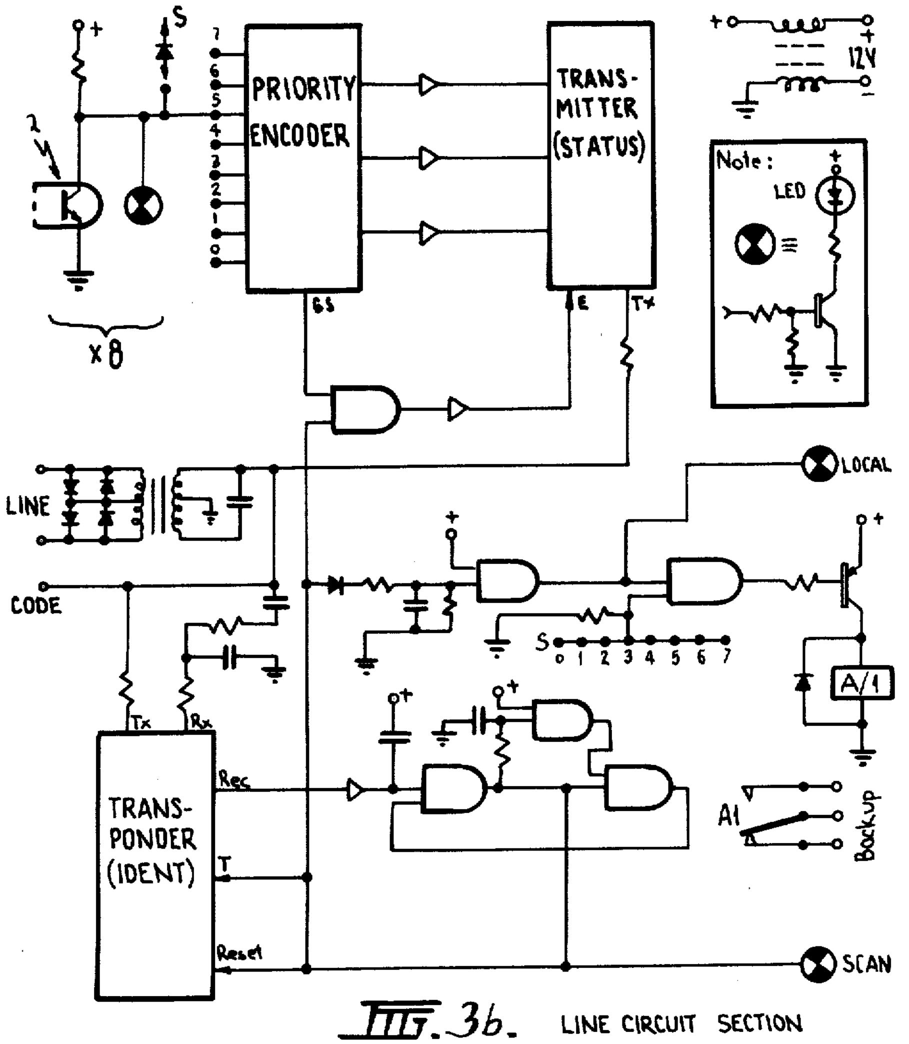
FIG. 3b. LINE CIRCUIT SECTION FIG. 4. E63 SELECTOR
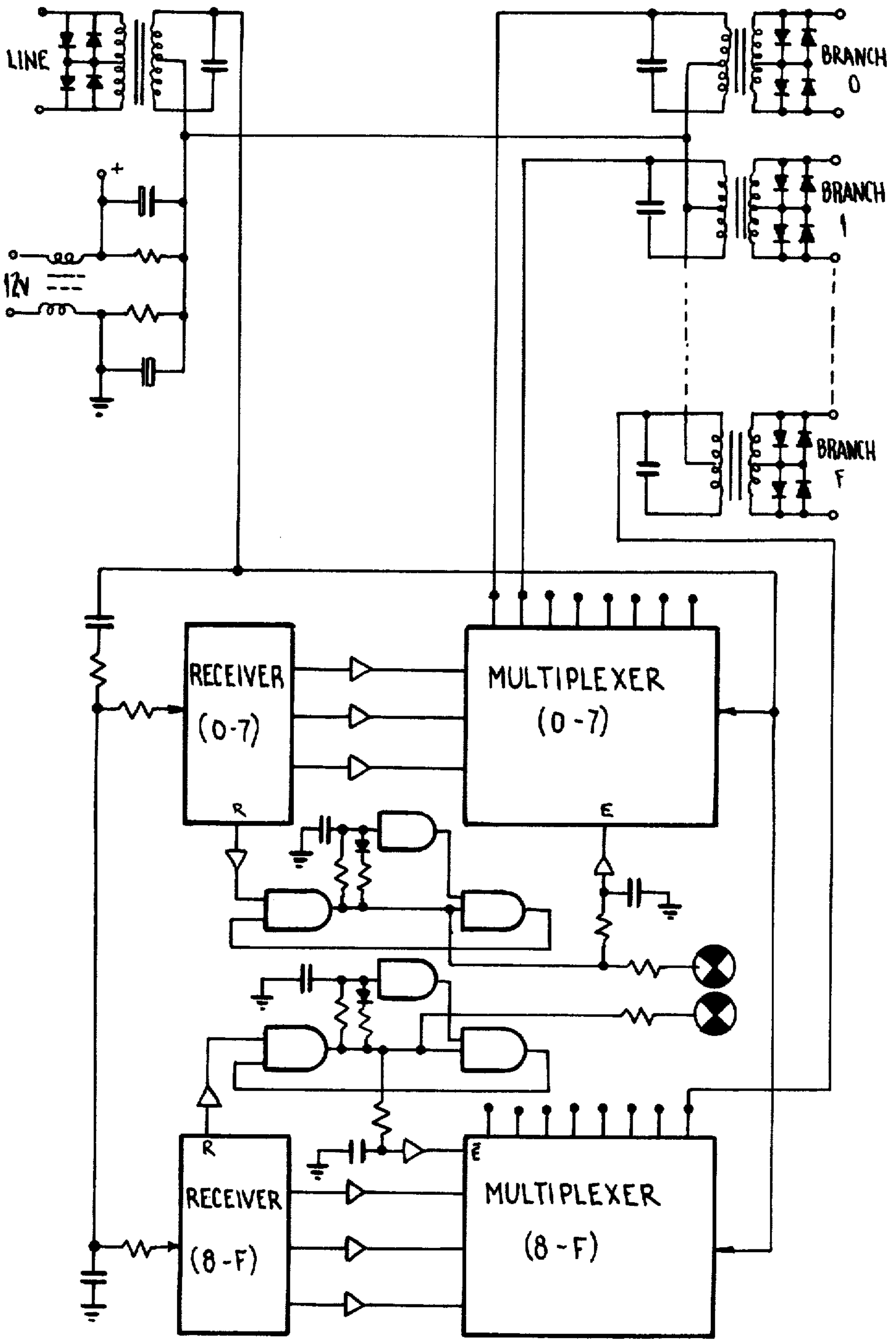

FIG. 5. E64 LINE DRIVER
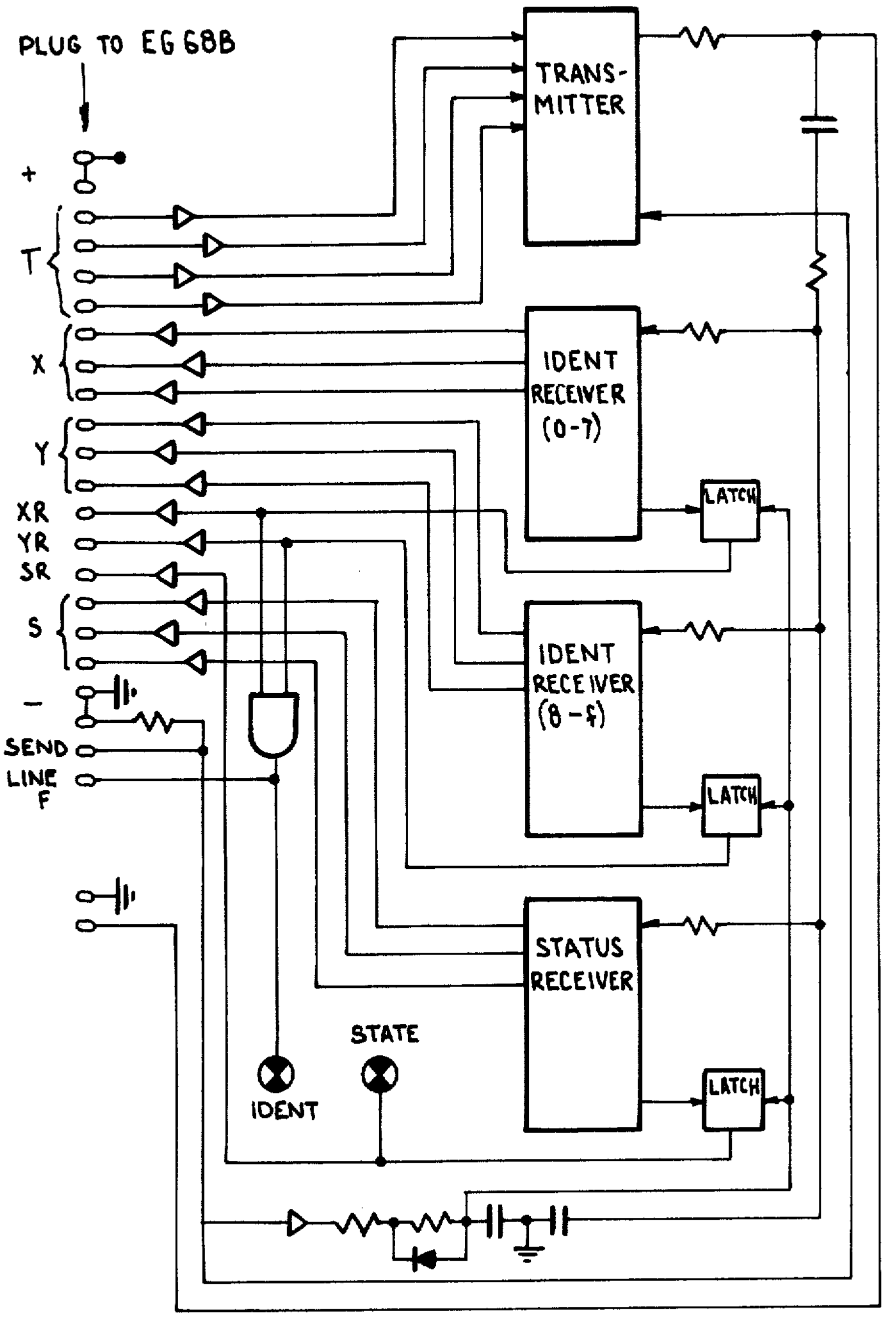

FIG. 6 . E68M MICROPROCESSER
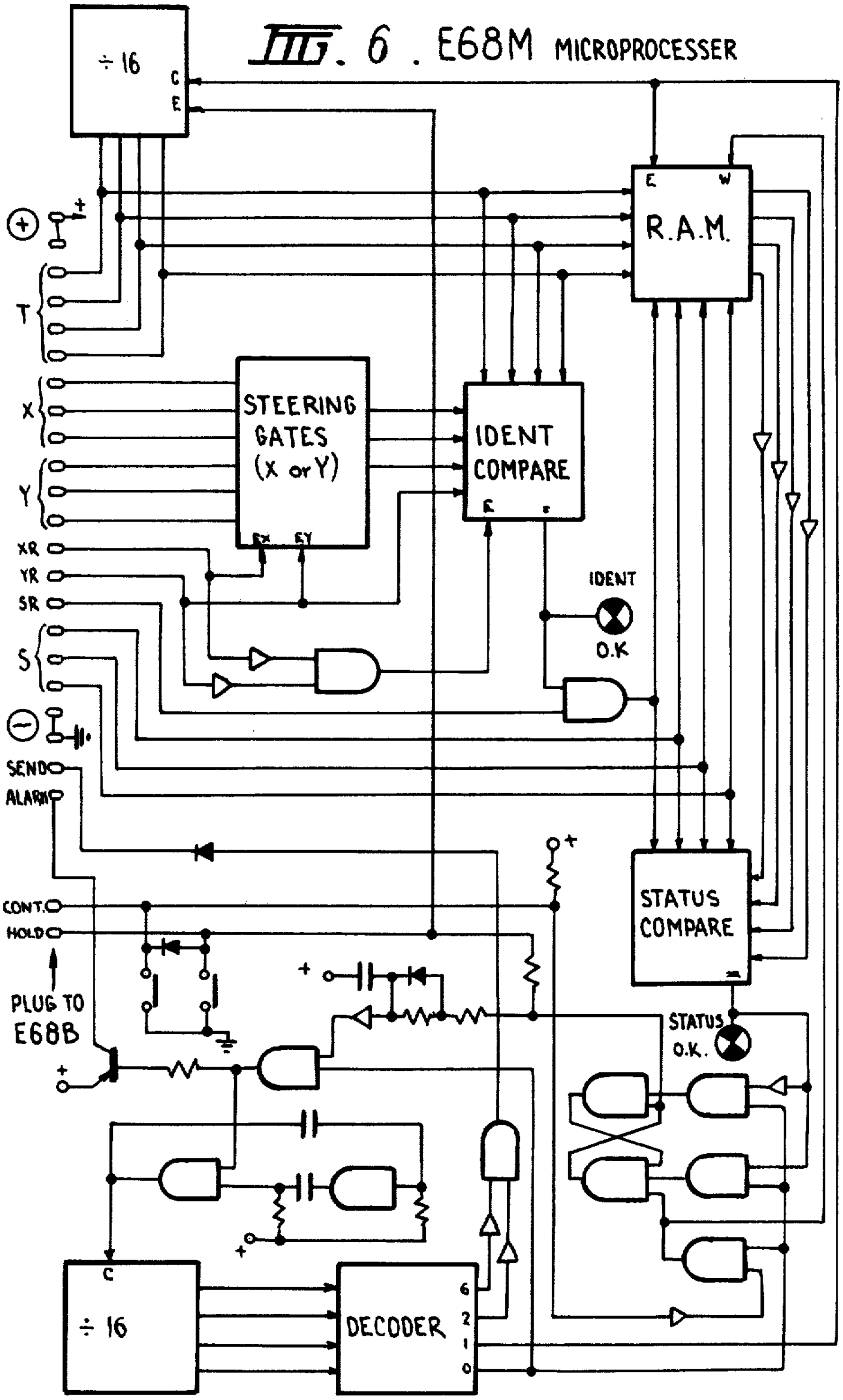

FIG. 7. E68D DISPLAY
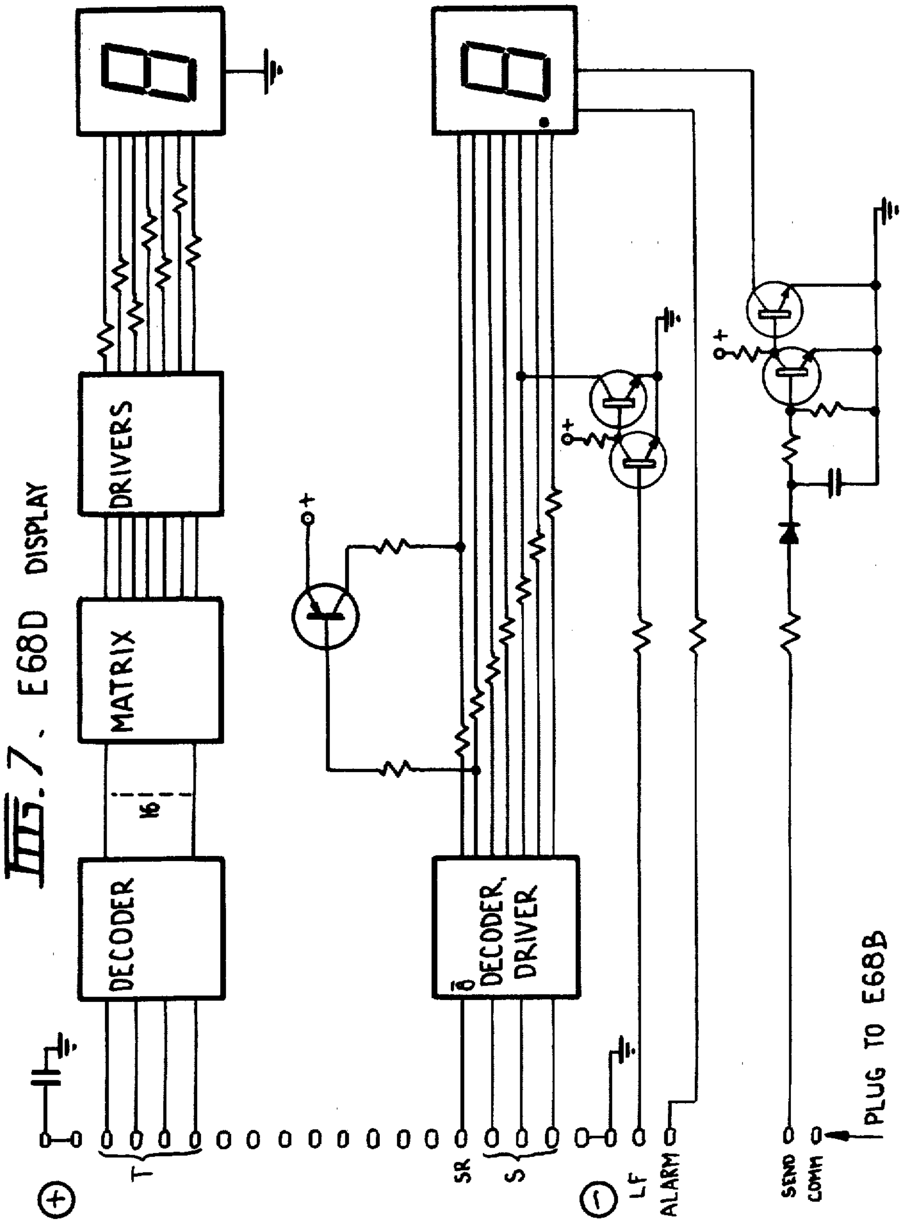

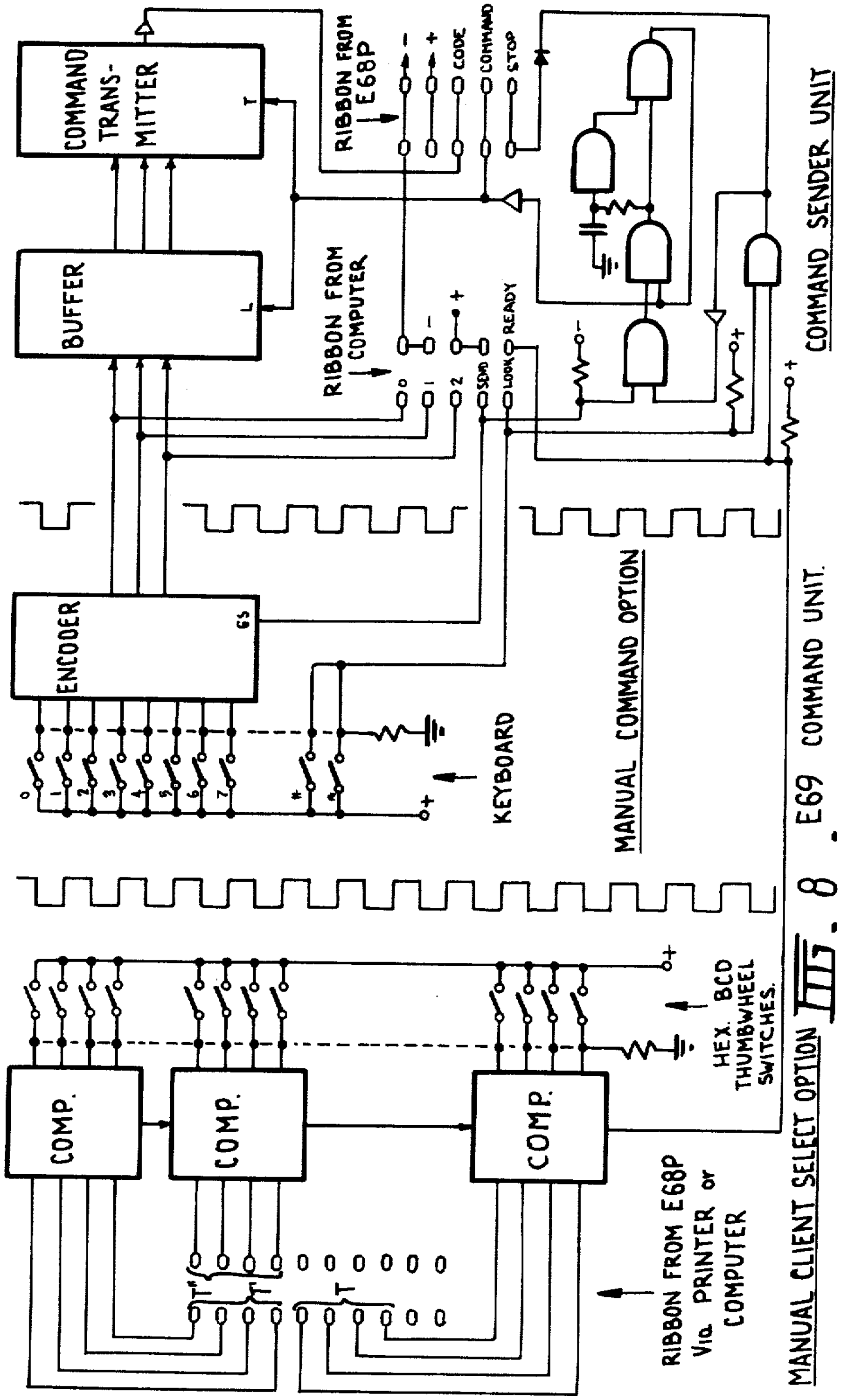
FIG. 8 E69 COMMAND UNIT.

AUTOMATIC CENTRALIZED MONITORING SYSTEM

The present invention relates to a centralised monitoring system. In particular it relates to a system where may premises are linked to a central station. Various functions in each one of the premises may be continuously monitored at that central station. Typical functions include the current status of a burglar alarm, holdup alarm, fire alarm, refrigerator temperature alarm, water level or flow alarm, machinery failure alarm or any other condition for which the status must be monitored. Information regarding the current status of such functions for each one of the premises are conveyed to the central station via landline, radio wave or other means. Thus this system may be utilised to monitor various premises owned by the same or independent clients.

BACKGROUND TO THE INVENTION

Systems have been known for many years which normally use a landline (via telephone exchanges) for direct connection between each client and the central station. However, these are basically a direct current system. Systems currently available may be relatively easily defeated. Therefore an intruder could bypass the correct operation of such systems and burgle premises without being detected. In other words "line security" is poor.

A further disadvantage of present systems is susceptibility to noise signals induced by interference, or to voltage loss over distance, or to accidental line reversal at a telephone exchange, or to earth path leakage, or to line imbalance.

So-called "high security" types may use pulses transmitted along the line, but in order to achieve any effective improvement in line security, either high speed data transmissions must be used (requiring very expensive high frequency lines) or alternatively a low data transmission rate is used and the time taken to acknowledge a change in status is long (reducing the security effectiveness).

In order to reduce the expense of line rental, systems have been developed to "concentrate" or "bunch" several lines together at a remote location. All clients in that area are thereby connected back to the central station via a single line from the said remote location, rather than an individual line each for the whole distance. Methods used include the "bunching block" which simply permits 19 lines to be wired in series and returned via the 20th line to the central station. However, if there is an attack on any one of the 20 lines, it is not possible to determine at the central station, which of the lines were attacked. In the event of an emergency, patrolmen would need to check 19 clients to find the correct one, losing much valuable time. Alternative systems use a "concentrator" which is a multipole switch such as a uniselector. Up to 100 clients near a remote location are sequentially switched and the status relayed to the central station via a single line. This method is slow and relies on mechanical switching. Line security is again poor.

Apart from questions of line security, line rental cost, speed and interference, the major problem for operators of central stations is the workload on operative personnel. At peak periods of activity, many people are required to attend to the equipment is there are several hundred clients. However, stations monitoring several thousand clients are common. An instance of this problem is, where there are several thousand clients with burglar alarms which they all "seal" (activate) upon closing their premises at around 5.00 pm. Because of this, attempts have been made to use the speed of computers to process this large amount of data with minimal delay.

Computerised systems presently available have simply scanned the lines which terminate at the central station. No system has yet been produced which achieves all the features of this invention, namely:

(1) The ability to transmit to the central station, several different statuses for each client.

(2) The achievement of very high line security without need for high frequency lines, yet permitting rapid update of information.

(3) At a remote location, the combination of several branch lines into one trunk line, which couples to the central station.

(4) Freedom from interference, d.c. paths, line reversal or voltage loss problems.

(5) Computer/microprocessor controlled scanning and multiplexing at a rapid rate.

(6) Different states may have different meanings for each client, under program control.

(7) The high reliability, miniaturisation, speed and low cost of solid state circuitry is used throughout.

(8) Local backup system in the event of any system failure or attack.

(9) Compatability for landline, radio channel or other carrier.

(10) Ability to control from the central station, several functions at the client's premises.

(11) Ability to operate independently of computer breakdown or service.

(12) Ability to identify the person operating the client's control panel.

In this specification reference to client and premises may indicate several clients in one building or a client in one each of several remote premises or several distinct areas under the responsibility of one client.

According to the invention an automatic centralised monitoring system capable of monitoring various functions in a plurality of separate premises including monitoring means for installation in said premises coupled to a line driver for transmitting an interogation signal to said monitoring means and a computer controlling said line driver said line driver being under the control of said computer means for initiating interrogation signals to said monitoring means and including means for interpreting reply signals received therefrom whereby a change of status such as a mal-function at any of said separate premises is detectable.

Conveniently the line driver is connected to a plurality of premises through a selector mechanism whereby a serial scanning operation can be performed on all premises connected to said driver.

In addition a grouping means accumulates the signals received from a plurality of line drivers whereby the computer can serially scan each line driver in sequence.

A portable automatic scanner may be provided to scan the signals from a group of premises controlled by a given line driver in the event of a breakdown.

BRIEF DESCRIPTION OF DRAWINGS

FIG. 1 is a block schematic of the major parts of the monitoring system in one of its forms.

FIG. 2 is a block schematic of the major parts of the monitoring system in another of its forms.

FIG. 3 is a circuit diagram of the control at the client's premises E62 of FIG. 2.

FIG. 4 is a circuit diagram of the selector control E63 of FIG. 2.

FIG. 5 is a circuit diagram of a line driver; E64 of FIG. 2.

FIG. 6 is the circuit diagram of the microprocessor (computer); E68M of FIG. 2.

FIG. 7 is the circuit diagram of the display; E68D of FIG. 2.

FIG. 8 is the circuit diagram of the command unit which is an optional feature of the present invention; E69 of FIG. 2.

DESCRIPTION OF THE INVENTION

Figure 9:
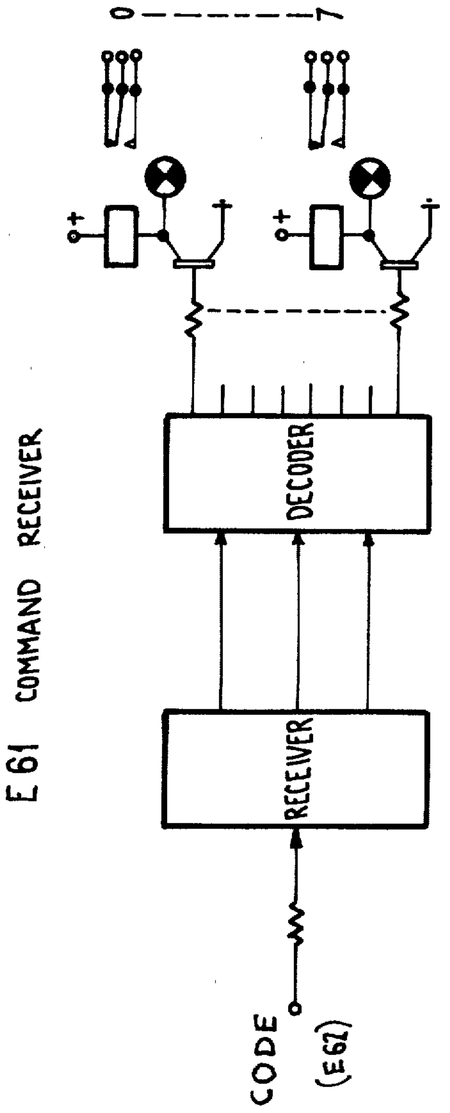
FIG. 9 is the circuit diagram of the command receiver; E61 of FIG. 2.

FIG. (1) is a block schematic of the major parts of the system. The number of clients who may be monitored is a factor of the size and speed of the computer. If the number of clients is 4096, this would require a computer memory of 4096 locations ("4K") for immediate access data storage. Description of the invention shall assume a capacity of 4096 clients but this figure is purely for illustration purposes. It is a feature of the invention that the time taken to scan all clients is imperceptively affected by changes in the total number of clients for which the system is programmed.

FIG. (1) shows a customer's "control" device which is located somewhere in his premises. Wiring within the premises is used to connect whatever form of detectors are required, e.g. intrusion detector, fire detector, thermostat, etc., or the output of complete systems or networks of such detectors. Also provided for the control is a function switch to select "day" or "night" operation; "on" or "off" etc. as required. There are eight possible statuses for the control. Thus different functions may be assigned to each of the eight status inputs of the control. If eight states prove inadequate, then additional controls could be added.

Table (1) illustrates a typical example of how the eight status conditions (numbered 0 to 7) may be assigned.

Table 1

10 status conditions for client alarm system, in order of increasing priority (higher priorities take precedence), for example:

(0) NIGHT SEAL (system set and ready)
(1) SECTOR 1 ALARM
(2) SECTOR 2 ALARM
(3) SECTOR 3 ALARM
(4) SECTOR 4 ALARM
(5) DAY SEAL (night system detectors bypassed)
(6) HOLDUP ALARM
(7) SYSTEM DEFEAT (tamper attack—defeat imminent)
(8) STATUS FAILURE (failure to receive status—local malfunction)
(9) LINE FAILURE (failure to transpond—line malfunction)

In addition it can be seen from Table 1 that there are two other states which the control may have. The status of the control is dictated by whichever of the status inputs in activated. However, to overcome the confusion if two status inputs are activated together, the status inputs are arranged in priority order (0 to 7). Higher priority states take precedence. Indeed this simplifies function switching, for if in the example of Table (1), "DAY SEAL" has been selected, all the night-time sectors (1 to 4) will be automatically bypassed, whereas a holdup alarm would still be recognised. Arrangement of the functions into an appropriate order of priority will achieve the most desirable arrangement for each individual client. It is a feature of the invention that not only are there eight totally uncommitted states available at each control, but each status may have a different meaning for different clients. This permits maximum flexibility and also is one factor which increases the difficulty of malicious substitution of equipment onto the line.

The method by which status and indentity information is obtained for the computer, commences with the transmission of a coded signal by the line driver. This signal is verified by the control and a coded reply signal is sent back to the line driver (which is also a line receiver). This coded reply is used to verify the correct client and to read the current status. Thus, at this point the correct indentification and status information for the client is stored at the line driver.

In order to defray the high cost of dedicating one line and associated line driver to each client, a selector may be located near to a group of clients. This selector permits the division of one line into preferably sixteen branches. One branch is dedicated to each client, instead of one line. The total line rental for sixteen clients in a shopping complex for example, would therefore divide by sixteen. Not all branches of the selector need to be utilized if there are fewer than sixteen clients in one area. Additional selectors may be used where more than sixteen clients are gathered.

To accommodate the addition of a selector between the line driver and controls (there now being sixteen such controls to each line driver), the line driver is provided with means to command the selector as to which client's control is selected. Thus, prior to the line driver transmitting its coded interrogation signal, it must first transmit a coded selection signal to this selector. An alternative to this system would be to couple all branches together such that the signals can mix, permitting the exchange of code signals without selection. However, this approach has major disadvantages in the rejection of interference (malicious or otherwise). If very high levels of interference on one branch prevents the proper transmission of signals, then all branches on that line are equally affected and furthermore, it would not be possible to see which branch was causing the trouble. Thus a mixing system suffers from the failings of the bunching block, even through tones rather than direct current may be used. By using a selector system signals never mix and the troublesome branch is easily identified. In addition, proper impedence matching on a 1:1 basis is maintained, thereby reducing the pickup of all forms of interference in the first place.

The coded signals referred to all take the form of a group of audio-frequency tones. Different tone frequencies represent different values. A sequence of such different tones is used to establish a code. These codes, being within the audio-frequency spectrum, may be transmitted via ordinary telephone type landlines (or radio voice channels). Different such codes are used to select and interrogate each client's control, whilst further such codes are used to reply the identity and status of each client. Entirely different frequencies may be used on different lines or the same codes may have different meanings on different lines. This variation is a further means by which malicious substitution of equipment is resisted. Such substitution is already difficult because of the complex nature of the coded signal and the fact that the significance of different states varies with each client. Indeed, the timing and duration of the tones is also critical. All these factors combined make for a high security system.

Although malicious substitution may well be regarded as impossible, there is a further "backup" feature which comes into operation, should the control fail to receive interrogation signals from the line driver. This failure may be caused by an attack on the line. After a lapse of (say) 15 seconds, the control reverts automatically to a backup system, which may take any form such as a local alarm or automatic telephone dialer. Upon initiation by selected detectors, this backup alarm would then be raised.

Means has thus been described whereby status and indentity information has been obtained for a particular client's control, and stored at the line driver. For convenience, sixteen such line drivers from a "group" and connect to a "group bus" for power and data distribution. One such group is mounted for convenience in a standard rack-mounting cabinet. Thus, there are sixteen lines connected to each group, with one line for each line driver. Because there are sixteen branches for each line, then one group has a capacity of 256 client's controls. If sixteen such groups are mounted together in a rack so that each group bus is interconnected, then the system has a capacity of 4096 clients' controls.

These sixteen groups which are interconnected, then couple to a "group driver." The purpose of the group driver (which may or may not be combined with the computer interface) is to store address data, permitting selection of the individual group, line and branch to be scanned.

For convenience, the format of this address data is arranged in standard hexadecimal format, rather than decimal. The sixteen branches are therefore indentified as:

0, 1, 2, 3,4,5,6,7,8,9,A,B,C,D,E,F rather than:
1,2,3,4,5,6,7,8,9,10,11,12,13,14,15,16

The lines and groups are similarly identified so that the complete address for a particular client's control, could be 2A9 for example, meaning group 2, line A, Branch 9. This method of addressing has particular advantage when working with mini-computers, which also operate with hexadecimals. Note that the decimal version of 2A9 would b 021009 which is unwieldy.

Thus, upon an address command such as "READ 2A9," the computer can, per medium of the interface, group driver and group bus, gain access to the status information stored in the line driver number 2A, regarding branch number 9. Having read this status information, it is programmed to compare this with the previously obtained status report on that client. This previous status report could be held in the computer memory location number 02A9 for example, so the simplicity of such an addressing method can now be appreciated. Should the new status differ from the previous status, the computer can be programmed for appropriate action. This action may include the printing of details and the sounding of an alarm. However, the specific action could be determined after the computer had referenced the significance of that new status in regard to that particular client.

The computer itself is an adjunct to the system and does not directly form part of the invention. It is a feature of the invention that the system is adaptable to virtually any computer of sufficient capacity, the only change required being the interface. The format of the invention permits a wide flexibility in the programming of the computer.

Having acted upon the status information of one particular client, the computer sequentially continues to scan each other client, taking appropriate action in each case.

Such a sequential scanning system could take a considerable time. For instance, if the operation was such that a client was selected, interrogated, read, status compared and acted upon, then the next client similarly treated, until all 4096 clients were processed, and if it took 0.5 seconds to complete the operation for each client, then the total scanning time would be 802 seconds. This would be totally unacceptable because an emergency might be notified 802 seconds (13.4 minutes) late. However, a period of 0.5 seconds for each client is realistic, considering coded audio frequency signals are being used. The answer to this problem lies in a very simple and yet quite novel feature of the invention.

The sequence of operations is bascially thus: The computer selects a branch number and causes all line drivers to select this same branch simultaneously. Each line driver then simultaneously interrogates its selected client's control. After a short delay, a reply from all selected controls is then simultaneously received and stored. Thus 256 controls have been selected, interrogated and have replied, in the space of about 0.5 seconds. The computer then scans each of the line drivers in sequence, at its own rapid speed, almost instantaneously. The computer then selects the next branch number and repeats the process. Thus for sixteen branches, the total scan time is $16 \times 0.5 = 8$ seconds, by which time 4096 clients have been processed. In practice, yet faster speeds are possible.

In the event of a branch line being damaged such that contact with the client's control is lost, then this client is identified at the central station automatically. However, if a trunk line is damaged such that contact is lost with sixteen branches, then this might make those sixteen customers vulnerable unless there are sixteen patrolmen available to attend, until repairs are effected. To overcome this problem, a portable automatic scanner has been devised. This device may be carried to the remote location where the selector is located. By attaching the portable scanner to the selector, monitoring of the sixteen clients can be easily accomplished by one man. The scanner contains the necessary memory and processing circuitry to achieve the same function as the computer, but on a smallers scale. During the time taken for the man to reach the remote location, security is maintained for each client by means of the backup system already described.

For extremely high risk situations where the above arrangement may be regarded as inadequate, a selector may be located within the central station itself, requiring a dedicated branch line from the station to each such client.

For new or small systems where the expense of a computer may not yet be justified, a number of portable scanners may be used at the central station. As the system expands, a computer can then be added, and the portable scanners remain useful in their emergencies role. A scanner may also be used to test each line prior to its connection into the main system.

In the event of a computer failure in a large system, the central station rack could be quickly plugged into a standby computer (which might normally be used for accounting purposes, for example). If the computer is not functioning for any reason for a period longer than (say) 15 seconds, then of course all client's controls automatically revert to their local backup system.

Whilst the description has concentrated upon the application of the invention to landlines, it is equally adaptable to radio channels or other forms of communication. If several radio channels of normal "voice" bandwidth are available, then these could be operated simultaneously using the same coded signals as described.

Unlike the landline application where the number of lines available may be limitless, there could be a severe restriction on the number of radio channels available unless microwave, or at least UHF frequencies are used. To achieve the same scanning speed for 4096 clients as is achieved with the landline application, then 256 channels would be required in place of the 256 lines. Otherwise the scanning speed would reduce, and if there were only 16 channels, the 4096 clients would be scanned in $256 \times 0.5 = 128$ seconds for example. This delay may be acceptable for low security applications.

In its practical form, when used with radio channels, each line driver would couple to one radio transceiver, set to a particular channel. A selector at a remote location could connect to another transceiver set to the same channel and thence via branch lines to each client. Alternatively there could be sixteen transceivers set to that channel, each connected to a client's control. No selector would then be used, because only the correctly addressed client's control would reply. A mixture of both methods would be possible. Indeed a mixture of trunk lines and radio channel links would be compatible within the one system. Any particular branch or trunk line could be replaced by a radio channel. The choice would depend on cost and availability.

Note that the groupings into multiples of sixteen is purely for convenience, rather than a limitation of the invention.

In order to achieve maximum computer speed and efficiency, immediately required data concerning each client, such as the previous status received and perhaps other key status conditions and time slots, may be stored in the computer memory. This key data could then be accessed in about a microsecond, thereby not introducing any perceptible delay. Should an abnormal status be received from a client, then a floppy disk store could be accessed to provide the name and address of the client and action to be taken. Such would be an infrequent occurrence and thus the delay involved ($\approx 1$ sec) not significant.

ALTERNATIVE FORMAT OF THE INVENTION

An alternative arrangement will be described having reference to FIG. 2. An inherent problem with systems based on computers is that should the computer break down or require service the system as a whole ceases to operate. As a consequence, it is desirable to use a computer in an information retrieval mode (i.e. for fast access to files) rather than in a control mode.

For this approach, the system relies on a number of scanners which are installed at the central station, each dedicated to one selector and up to 16 client's controls. For a simple or small system, this alone would suffice. For larger systems, each scanner is coupled to a data bus, enabling the automatic recording of alarm conditions registered at each scanner. This data bus is coupled to a printer or to a computer. The purpose of the computer is then purely to act as an electronic filing system, whereby the action to be taken by the operator is printed, in accordance with the particular status change of each client. Thus, in the event of computer breakdown or service, the scanners continue to operate and display all status changes (reverting to a manual operation).

Special care is paid in the invention, to overcome faulty operation in the event of any kind of line interference. Firstly, should the coded tones be imperfectly received, then the receivers always give a zero output in preference to an incorrect output. Secondly, the tones are sent for a longer period than necessary so that should an occassional cycle be missed, this is ignored. However, to further improve the rejection of interfering phenomena, the scanner is configured such that, in the event of an apparent change in status for a particular client (including a line fault) then the client's control will be re-interrogated one or more times (as required) to verify this change. If the change does not recur, the scanner ignores the change and continues with the next client etc. If the change is perpetuated, the scanner stops and activates an alarm output. The changed data on that client is thereby provided for recording automatically or manually. After this recording has taken place, the scanner continues with the next client etc., upon operation of a manual "continue" switch or upon an automatic "continue" pulse from a printer or computer.

A "hold" function is also available automatically or manually to permit close scrutiny of a particular client, by holding the selector at the relevant branch line. This permits very rapid update of information (16 times faster than normal) and also assists with initial setup.

It is also possible to permit the remote control of certain equipment at the client's premises. Circuitry may be added at the client's control to recognise command signals sent from the central station. These signals utilize the same type of coded tone transmissions for high security. Thus, upon operator decision or computer command, equipment at the client's premises may be commanded at any time, or in response to certain changes in status. Only those clients requiring this facility need have it installed, thereby lowering the overall cost. For convenience eight command functions are available in a standard system, but this may be increased.

Identification of the person operating the client's control panel may be achieved by use of an additional push-button keyboard, to activate status inputs. The sequence of status digits received subsequent to a "day seal" would provide the personal entry code.

DESCRIPTION OF THE CIRCUITRY (PREFERRED EMBODIMENTS OF THE INVENTION)

(1) E62 CLIENT'S CONTROL-REFER TO FIGURES 3(*a*) and 3(*b*).

The "alarm system" section of the E62 control (see FIG. 3(*a*)) consists of a latchable alarm "status" monitor coupled to an optical isolator. Should the resistance of the alarm circuit connected to the input fall below or above predetermined limits then the current in the photodiode will cease. Thus this sensitivity to resistance change achieves a degree of tamper immunity in the alarm circuit wiring. There are eight sets of these alarm status monitors. They are powered from one 12 V source and are completely isolated from the "line circuit" section of the E62 control, by the optical isolators. These form a prime defence against alarm circuit or mains voltages reaching the branch line.

The "line circuit" section of the E62 control, see FIG. 3(*b*), includes the eight photo-transistors of the optical isolators which couple directly to a "priority encoder" integrated circuit. Also provided is a "light-emitting diode" (LED) and drive transistor to display the condition of each status monitor. The priority encoder selects the input of highest priority and converts it to the binary equivalent value. This binary information is presented via inventors to a "status transmitter" integrated circuit. Thus the status transmitter is ready to send information of the current status of the alarm circuits. A logic gate is added to prevent operation of the status transmitter, should none of the status inputs be activated (implying null status).

Also included in the lines circuit section of the E62 control is a "transponder" integrated circuit. This is coupled to the branch line via an isolating transformer. This transformer gives a second defence against the possibility of alarm circuit or mains voltages reaching the line. It is to be noted that the entire line circuit section of the E62 control operates from a double-insulated 12 V source, (distinct from the 12 V source which powers the alarm system section) and forms a prime defense against A.C. mains voltage.

Upon receipt of a coded audio signal via the line from the central station, the transponder decodes the signal. If this signal conforms to a predetermined sequence, duration and accuracy of frequencies, then the signal is accepted. The transponder then sends a coded reply signal via the line, back to the central station. At the same time a "pulse stretcher" circuit is activated.

This causes a "scan" LED to light momentarily to indicate to the client that the E62 control has been interrogated. The output from the pulse stretcher is also used to activate the status transmitter, so that a further coded signal is sent via the line to the central station.

The "backup" system is also operated from the pulse stretcher, whereby a "diode pump" counter is used. Should there not be received an interrogation signal from the central station within a predetermined period (normally 15 seconds) then the diode pump capacitor will discharge and operate a logic gate. This in turn will cause operation of the "local" LED, indicating to the client that his control has reverted to local backup. Then, should any predetermined one of the alarm status monitors be activated, the backup relay will operate. This relay provides uncommitted output contacts which form a prime defense against any circuit voltage to which they may be connected.

(2) E63 SELECTOR—REFER TO FIG. 4

The E63 Selector is used to couple one trunk line from the central station, to sixteen branch lines whereby there is one branch line to each client's E62 control. There is provided sixteen isolation transformers to couple to the branches plus an additional transformer to couple to the trunk line. These transformers are identical to the one used in each E62 control and thus form a second defense against A.C. mains voltages. The prime defence against A.C. mains voltages is within the 12 V source.

The E63 Selector includes two "receiver" integrated circuits. Two are used because each has only a capacity of eight output conditions. Upon receipt of a coded audio signal from the central station, if the signal has the correct sequence, duration and accuracy of frequencies, then a binary output will result from one of the receivers. This binary output is presented via invertors to an 8-channel "analog multiplexer" integrated circuit. Logic gates select which of the two multiplexers should operate. Depending upon the value of the binary information, one of the channels will be operated, thereby permitting the passage of subsequent coded audio signals between the trunk line and the selected branch.

(3) E64 LINE DRIVER-REFER TO FIG. 5.

The E64 Line Driver couples to the trunk line via an identical transformer to that used on the E63 selector and E62 control, forming a second defense against mains voltages at the central station. This transformer may be located remotely from the E64 circuit board for convenience. These transformers also prevent interference to the signals due to commn-mode, D.C. and polarity considerations. On the line side of each transformer is also provided a set of clipping diodes which prevent the passage of any line voltage which exceeds ±1.2 volts. The E64 line driver itself operates from a single 12 volt source which forms a prime defense against A.C. mains voltages.

The E64 line driver is controlled by digital inputs which may couple either to a computer interface or to an E68 scanner.

The appropriate binary address information is presented to a "transmitter" integrated circuit, via invertors. Upon a "SEND" command, the transmitter sends a coded audio signal via the transformer to the E63 selector. This causes selection of the desired branch and hence the desired client's E62 control.

The transmitter is then caused to send another coded audio signal, in order to address the client premises. The transpond signal from the client is then received via the line and transformer by one of the two "identification" receiver integrated circuits. Two are used because each has only a capacity of 8 premises. If the reply signal has the correct sequence, duration and accuracy of frequencies, then the binary output of one of the identification receivers will operate. A pair of gates wired as a latch will record which receiver operated.

Also provided is a "status" receiver integrated circuit. A subsequent coded signal sent from the E62 control will be received by this receiver. If this status signal has the correct sequence, duration and accuracy of frequencies, then the binary output of the receiver will operate. A pair of gates wired as a latch will record that the signal was received.

(4) E68M SCANNER MICROPROCESSOR-REFER TO FIG. 6

The E68M scanner microprocessor, couples directly to one E64 line driver via an E68B data bus and its purpose is to control the sequence of operations of the E64. Also used in conjunction is an E68D numerical display which is used to display the binary "status" and "client" data in decimal or hexadecimal form.

The E68 scanner contains a "clock" circuit to produce pulses at say a 20 Hz rate. These pulses are presented to a first "hexadecimal counter" with a "binary decoder". Outputs from this decoder are used to control the sequence of operations:

Upon the first clock pulse, the first hexadecimal counter is incremented, and via the decoder, a second hexadecimal counter is incremented. The output of this second hexadecimal counter is coupled to the E64 line driver and this determines which client will be selected. The counter output is also presented to a "random access memory" and the "indent comparator". At this point, the E68D display shows the value held in the counter and hence indicates the selected client.

Upon the next clock pulse the first counter is again incremented and a "SEND" instruction is presented to the E64 line driver, via the decoder and logic gates. This causes the E64 to send a signal to the E63 selector, to cause selection of the required branch. There is a subsequent pause of three clock periods to allow for time for the transmission of this signal.

Upon the sixth clock pulse, the "SEND" instruction is repeated but on this occasion the E64 line driver signal will reach the required client's E62 control. Thus there will follow reply signals from the E62, representing the client identification and status. These signals are received at the E64 line driver and the binary information is presented to the E68M scanner microprocessor via the E68B data bus. A series of gates is used to select which of the two E64 identification receivers is relevant, and the resultant binary data is presented to the ident comparator. Provided one of the ident receivers has operated, the ident comparator is enabled. If the ident data received is the same as the address data currently held at the hexadecimal counter, then the "=" output of the ident comparator operates and is presented to the "status comparator". The status information held in the E64 is also presented to the status comparator.

The random access memory contains the status previously held for that client. If the current status is equal to the previous status, the "=" output of the status comparator operates. At this point the E68D display shows the current status.

To enable time for the transfer of these signals there is a delay period of ten clock pulses. Upon the fifteenth clock pulse the data is analysed. If the status is unchanged, then normal scanning operaion will continue. However, if the status has changed (including if the ident signal is not received or is incorrect or if the status signal is not received), then a latch will operate and a timer will commence. The client's control will be reinterrogated in accordance with the above sequence with the exception that the second hexadecimal counter will of course not be incremented and selector will not be advanced. If the change in status is perpetuated beyond the timer duration, then scanning will halt and the alarm output will operate. Operative personnel are then able to view the L.E.D.'s on the E64 and E68M together with the client and status data presented by the E68D display. If a printer or computer is attached, appropriate information will be printed automatically.

Scanning will continue if the operator presses the "CONTINUE" switch, or alternatively upon receipt of a pulse from the printer or computer. Upon continuing, the random access memory is updated with the current status data. The scanning process will then continue with the next client in the manner described, such that all clients are sequentially and continuously scanned.

Use of a timer circuit to control the reinterrogation of a client's control permits flexibility in the choice of the number of re-interrogations required before the alarm is raised. Should the status received revert to the original status during this period, the latch and timer will reset and scanning will recommence with the next client etc.

Should the operator wish to view one client's control only, upon operation of the "HOLD" switch, the E68M will continually interrogate that client but otherwise operate as above.

(5) E68D DISPLAY-REFER TO FIG. 7

The E68D couples to the E68M and E64 to produce a visual display of the current branch number and status.

The branch data (client number) is output from the E68M and presented to a 4-bit "decoder" which has 16 outputs. Only one output is active at a time, indicating the client number. A diode "matrix" converts this information to suit a seven-segment numerical display, which is operated via a set of seven "drivers." The matrix is configured to permit hexadecimal readout from the seven-segment display (0,1,2,3,4,5,6,7,8,9,A,b,C,d,E,F).

The status data is output from the E64 and is presented to a "decoder/driver". A seven-segment display is then driven from the decoder/driver. Output from the decoder/driver is modified by a 'transistor' which modifies the seven-segment code for compatability of the numeral "6" with that displayed on the client readout. The decoder is so wired as to produce the numeral "8" in the absence of a status signal (status fault) and is modified to produce the numeral "9" in the absence of an ident signal (line fault).

(6) E68B DATA BUS—REFER TO FIG. 2.

The E68B Data Bus is used to provide interconnection between the E64, E68M and the E68D. It also permits connection to the "printer bus" via a set of "buffers." These buffers are used so that only the data from the selected scanner is presented to the printer (or computer) when required.

The landline (or other carrier) connection is made to the E64 via the E68B. In addition, provision is made for the connection of power (12 V DC) to operate the scanner and also an output is taken to drive a common audible alarm.

For purely manual operation, the printer bus need not be connected. For use as a "portable scanner," a portable printer may be used if required.

(7) E68P PRINTER CONTROLLER—REFER TO FIG. 2

All E68B data buses are wired in parallel using a flat ribbon cable, which forms the "printer bus." This printer bus couples to the E68P Printer Controller. The purpose of the controller is to sequentially switch the data contained on each E68B, onto the printer bus.

Thus there is provided a 500 Hz oscillator (clock) to advance a pair of "hexadecimal counters" wired in cascade. The current value of these counters is displayed on seven-segment readout displays, for operator convenience. The binary output of the second counter is presented to a "hexadecimal decoder" located on an E68G "group bus." The outputs of this decoder are used to enable further hexadecimal decoders, each in an E68S "set bus" and each connected to the binary output of the first counter, to determine which particular E68B will be read. In this way, up to 256 scanners, (catering for 4096 clients), are sequentially loaded onto the printer bus. Thus, the data available to the printer at any instant, corresponds with the client then described on the seven-segment displays.

Should the particular client be in the alarm condition at the time when his data is read, the counters are disabled from advancing. The printer is then enabled to print all the data. An automatic "continue" pulse from the printer enables the counters (by resetting the appropriate scanner), or alternatively a manual "continue" button may be pressed.

(8) E69M COMMAND TRANSMITTER and E61 COMMAND RECEIVER—REFER TO FIGS. 8 & 9

The E69M is a manually-operated command transmission unit. It enables the command of various functions to take place at the client's premises. It simply adds to an existing central station using E68 type scanners. An automatic version, the E69C is used for direct control of the command functions by computer.

Upon selection of the required client, depressing the appropriate function button (numbered 0 to 7) will operate a monostable circuit, to produce a pulse of preset width. At the same time, an "encoder" converts the decimal function information to binary form and presents this to a "buffer". The monostable pulse causes the buffer to latch and hold this binary information, and present it to the "command transmitter."

The monostable pulse also causes the E64 to send a signal to the E63 selector, causing it to open the branch channel to the required client. After a preset delay, sufficient to allow this signal to be received, the command transmitter then sends its signal via the E64 and E63 to the selected client.

Provided an E61 Command Receiver has been installed at the client's E62 control, then the command signal will be received, decoded (from binary to decimal form) and the appropriate output relay will operate until such time as a different command is received.

I claim:

1. An automatic centralized monitoring system capable of monitoring various functions in a plurality of premises: comprising, a central station, said premises being adapted to be linked to said central station, monitoring means comprising one or more sensors adapted to be located in each of said premises, a plurality of m line driver means located at said central station linked to said premises, said premises being arranged in m unique groups with each group having a capacity of n premises, (m and n each being integers greater than one), each of the m line driver means being connected to a respective one of the unique groups, said line driver means being controlled by a computer means which is arranged to cause all the line driver means to:
   (a) simultaneously select a predetermined first one of each of the n premises of its respective group of premises;
   (b) read the sensor, or sensors, at each of the predetermined premises simultaneously, multiplex the readings, and transmit the multiplexed readings from all of the line driver means to the computer which can then rapidly interpret the received readings;
   (c) simultaneously select a predetermined second one of the n premises of its respective group of premises, and repeat the process of "b;"
   (d) continue to select an additional predetermined premise in each group in the manner described in a and b until all n premises have been interrogated, whereby the total time of scanning and interpreting is made short by using the speed of the computer for demultiplexing and interpreting.

2. A monitoring system as claimed in claim 1, wherein each line driver means is adapted to transmit a signal to a predetermined number of monitored premises via a selector means coupled into the signal carrier channel between each line driver means and the premises, each said premises being coupled to said selector means by a branch carrier channel.

3. A monitoring system as claimed in claim 1, wherein said computer means comprise a plurality of independent micro computer means, and said plurality of line driver means are each adapted to be coupled to a separate one of said independent micro computer means at said central station, each combination of a line driver means and a micro computer being referred to herein as a scanner means to maintain monitoring of the plurality of premises under the control of said line driver means in the event of any failure in neighboring scanner means which may be connected thereto.

4. A monitoring system as claimed in claim 3, wherein a plurality of said scanner means is adapted to be coupled to a data bus which in turn is adapted to be coupled to a data logging printer or interpretive computer means or both whereby the action to be taken by the operator in the instance of a monitored alarm is printed.

5. A monitoring system as claimed in claim 1 wherein command signals are adapted to be produced at said central station to control equipment at a given premises.

6. A monitoring system as claimed in claim 1, wherein said monitoring means includes at least one latchable alarm monitor having a predetermined input circuit loop resistance, the arrangement being such that should the resistance fall outside a predetermined range caused by abnormal conditions, the alarm is raised.

7. A monitoring system as claimed in claim 6, wherein said monitoring means includes a line circuit coupled to said latchable alarm monitor and a light emitting diode adapted to display the condition of each alarm monitor.

8. A monitoring system as claimed in claim 2, further including a portable scanner means being adapted to be coupled to said selector means in the event of a communication channel fault to monitor the premises coupled to said selector means isolated from said central control.

9. A monitoring system as claimed in claim 1, wherein said monitoring means at said premises includes a backup means whereby a local alarm, such as an automatic telephone dialer, is activated if said monitoring means fails to receive interrogation signals after a predetermined delay period.

10. A monitoring system as in claim 3, wherein said central station and said premises are all within a single building complex or property.

11. A monitoring system as in claim 1 wherein said monitoring means are interrogated by a complex code which provides for different codes, for the same monitored condition, at different premises thereby providing a high degree of line security.

* * * * *